US009815454B2

(12) United States Patent
Tabata et al.

(10) Patent No.: US 9,815,454 B2
(45) Date of Patent: Nov. 14, 2017

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Atsushi Tabata, Okazaki (JP); Toshiki Kanada, Toyota (JP); Tatsuya Imamura, Okazaki (JP); Isao Satou, Nagoya (JP); Kazuyuki Shiiba, Miyoshi (JP); Tooru Matsubara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/905,401

(22) PCT Filed: Aug. 2, 2013

(86) PCT No.: PCT/JP2013/071072
§ 371 (c)(1),
(2) Date: Jan. 15, 2016

(87) PCT Pub. No.: WO2015/008395
PCT Pub. Date: Jan. 22, 2015

(65) Prior Publication Data
US 2016/0159341 A1 Jun. 9, 2016

(30) Foreign Application Priority Data

Jul. 17, 2013 (JP) ................................. 2013-148298

(51) Int. Cl.
*G05D 1/00* (2006.01)
*B60W 20/20* (2016.01)
(Continued)

(52) U.S. Cl.
CPC ............. *B60W 20/20* (2013.01); *B60K 6/442* (2013.01); *B60K 6/445* (2013.01); *B60W 10/06* (2013.01);
(Continued)

(58) Field of Classification Search
CPC ..... B60T 11/103; B60T 2270/60; B60K 6/00; B60K 6/442; B60L 11/1851;
(Continued)

(56) References Cited

U.S. PATENT DOCUMENTS

2008/0119313 A1* 5/2008 Usoro .................... B60K 6/365
475/5
2009/0131215 A1* 5/2009 Shamoto ................ B60K 6/365
477/3
(Continued)

FOREIGN PATENT DOCUMENTS

JP 2000-27672 A 1/2000
JP 2006-300274 A 11/2006
(Continued)

*Primary Examiner* — Muhammad Shafi
(74) *Attorney, Agent, or Firm* — Andrews Kurth Kenyon LLP

(57) ABSTRACT

A control system for a hybrid vehicle having an engine and a plurality of motors is provided. An operating mode of the hybrid vehicle is selected depending on a required driving force from a first mode where the vehicle is powered by the engine, a second mode where the vehicle is powered by the plurality of motors, and a third mode where the vehicle is powered by any one of the motors. The control system is characterized by a detection means that detects an output power of the prime mover, and a setting means that alters a selectability of the second mode in accordance with the output power of the prime mover.

12 Claims, 12 Drawing Sheets

(51) Int. Cl.
*B60K 6/445* (2007.10)
*B60K 6/442* (2007.10)
*B60W 10/06* (2006.01)
*B60W 10/08* (2006.01)

(52) U.S. Cl.
CPC .......... *B60W 10/08* (2013.01); *B60Y 2200/92* (2013.01); *B60Y 2300/182* (2013.01); *B60Y 2300/43* (2013.01); *B60Y 2300/60* (2013.01); *Y02T 10/6234* (2013.01); *Y02T 10/6239* (2013.01); *Y02T 10/6286* (2013.01); *Y02T 10/7258* (2013.01); *Y10S 903/93* (2013.01)

(58) Field of Classification Search
CPC ............. B60L 2240/10; B60L 2250/00; B60L 2260/00; B60L 2270/00; B60L 3/00; B60L 7/10; B60W 10/08; B60W 10/26; B60W 10/28; B60W 20/00; B60W 2510/08; B60W 20/20; B60W 6/442; B60W 10/06
USPC .......................................................... 701/22
See application file for complete search history.

(56) References Cited

U.S. PATENT DOCUMENTS

| | | | |
|---|---|---|---|
| 2010/0024769 A1* | 2/2010 | McDonald ............ | B60W 10/06 123/406.21 |
| 2010/0125019 A1* | 5/2010 | Tabata .................. | B60K 6/365 477/3 |
| 2012/0035017 A1* | 2/2012 | Nagai .................. | B60W 10/06 477/32 |
| 2012/0265387 A1* | 10/2012 | Hisada .................. | B60K 6/383 701/22 |
| 2013/0218394 A1* | 8/2013 | Kanayama ............ | B60K 6/442 701/22 |

FOREIGN PATENT DOCUMENTS

| | | |
|---|---|---|
| JP | 2008-265598 A | 11/2008 |
| JP | 2012-224148 A | 11/2012 |
| WO | 2012/059996 A1 | 10/2012 |

\* cited by examiner

|  |  |  | C1 | B1 | MG1 | MG2 |
|---|---|---|---|---|---|---|
| EV | Forward/Backward | Single-Motor Mode — Drive |  |  | G | M |
|  |  | Single-Motor Mode — Engine Braking | △ | △ | G | M |
|  |  | Dual-Motor Mode | ○ | ○ | M | M |
| HV | Forward | High |  | ○ | G | M |
|  |  | Low | ○ |  | G | M |
|  | Backward | Low | ○ |  | G | M |

○: Engaged    △: Selectively Engaged to Apply Engine Braked
G: Mainly Generator    M: Mainly Motor but Generator at Re-generation

CONTROL SYSTEM FOR HYBRID VEHICLE

CROSS-REFERENCE TO RELATED APPLICATIONS

This is a national phase application based on the PCT International Patent Application No. PCT/JP2013/071072 filed Aug. 2, 2013, claiming priority to Japanese Patent Application No. 2013-148298 filed Jul. 17, 2013, the entire contents of all of which are incorporated herein by reference.

TECHNICAL FIELD

The present invention relates generally to a control system for a hybrid vehicle in which a prime mover includes an engine and a motor having a generating function.

BACKGROUND ART

A hybrid vehicle has an internal combustion engine such as a gasoline engine and a diesel engine (as will be simply called the "engine" hereinafter), and a motor having a generating function. In the hybrid vehicle, a fuel efficiency of can be improved and a gas emission can be reduced by operating the engine and the motor in an optimal way. One example of the hybrid vehicle of this kind is disclosed in Japanese Patent Laid-Open No. 2008-265598.

According to the teachings of Japanese Patent Laid-Open No. 2008-265598, the hybrid vehicle comprises an engine, a first motor, a second motor, and a power distribution device such as a planetary gear unit having three rotary elements. A rotation of an output shaft of the engine is halted by a clutch. The first motor is connected to the output shaft of the engine through the power distribution device, and the second motor is connected to driving wheels. The engine, the first motor, the second motor, and the clutch are controlled in accordance with a required driving force. In the hybrid vehicle, a motor mode can be established by activating the first and the second motors while using the power distribution device as a speed reducing device or a speed increasing device by bringing the clutch into engagement to halt the output shaft of the engine.

In the hybrid vehicle taught by Japanese Patent Laid-Open No. 2008-265598, specifically, an operating mode can be selected from "an engine mode" in which the vehicle is powered by the engine, "a single-motor mode" in which the vehicle is powered only by the second motor, and "a dual-motor mode" in which the vehicle is powered by both the first and the second motors while reducing the engine speed to zero by bringing the clutch into engagement. In the hybrid vehicle, therefore, fuel efficiency can be improved by appropriately selecting the operating mode to operate the engine and the motors in an optimal way.

However, on the occasion of shifting the operating mode from "the engine mode" in which the vehicle is powered by the engine to "the dual-motor mode" in which the vehicle is powered by both first and second motors, the engine is stopped while temporarily propelling the vehicle only by the second motor, and then the clutch is brought into engagement to establish "the dual-motor mode". Indeed, a drive torque generated only by the second motor is smaller than that generated under "the engine mode", and hence the drive torque to propel the vehicle drops temporarily when shifting from "the engine mode" to "the dual-motor mode". In this situation, if the drive torque drops significantly against the driver's will, the driver may feel a shock and discomfort.

DISCLOSURE OF THE INVENTION

The present invention has been conceived noting the foregoing technical problem, and it is therefore an object of the present invention is to provide a control system for a hybrid vehicle in which a prime mover includes an engine and a plurality of motors, that is configured to shift an operating mode smoothly from a mode in which the vehicle is powered by the engine to a mode in which the vehicle is powered by the motors.

The control system according to the present invention is applied to a hybrid vehicle in which a prime mover includes an engine and a plurality of motors, and in which an operating mode is selected depending on a required driving force from a first mode where the vehicle is powered by the engine, a second mode where the vehicle is powered by the plurality of motors, and a third mode where the vehicle is powered by any one of the motors. In order to achieve the above-explained objective, according to the present invention, the control system is provided with a detection means that detects an output power of the prime mover, and a setting means that alters a selectability of the second mode in accordance with the output power of the prime mover.

The setting means includes a means that reduces the selectability with an increase in the output of the prime mover.

The setting means further includes a means that inhibits the second mode if the output of the prime mover is greater than a predetermined value.

The setting means further includes a means that renders the second mode unavailable to be selected if the output of the prime mover is greater than a predetermined value.

The detection means includes a means that detects a speed of the engine, and the setting means further includes a means that inhibits the second mode if the speed of the engine is greater than a predetermined value.

The detection means includes a means that detects a speed of the engine, and the setting means further includes a means that renders the second mode unavailable to be selected if the speed of the engine is greater than a predetermined value.

The required driving force may be calculated based on an opening degree of an accelerator and a vehicle speed.

The hybrid vehicle comprises: a power distribution device as a differential gear unit having a first rotary element connected to the engine, a second rotary element connected to a first motor to serve as a reaction element against a rotation of the first motor, and a third rotary element that is connected to a second motor and a drive shaft and that is rotated at a speed governed by speeds of the first rotary element and the second rotary element; and a brake that selectively halts a rotation of the first rotary element. The power distribution device is adapted to transmit a torque between the prime mover and the drive shaft while splitting or synthesizing the torque.

Thus, according to the present invention, the control system is applied to the hybrid vehicle comprising the engine and at least two motors, and the operating mode of the hybrid vehicle is selected depending on a required driving force form the first mode where the vehicle is powered by the engine, the second mode where the vehicle is powered by the plurality of motors, and the third mode where the vehicle is powered by any one of the motors. Therefore, a driving force for propelling the vehicle can be controlled appropriately in an optimally fuel efficient manner. According to the present invention, specifically, selectability or availability of the second mode is altered depending on an output torque of the prime mover such as the engine and the motors. For this reason, the operating mode can be shifted smoothly from the first mode to the second mode to improve operability and comfort of the vehicle.

According to the present invention, more specifically, the selectability of the second mode is reduced with an increase in the output of the prime mover. That is, the second mode is rendered unavailable to be selected an increase in the output of the prime mover. To this end, for example, the region where the second mode is selected is narrowed in the map for determining the operating mode based on the required driving force. According to the present invention, therefore, a shifting operation to the second mode is prevented if the output power of the engine is large during propulsion and hence the driver may feel shocks and discomfort resulting from shifting to the second mode.

In other words, according to the present invention, the selectability of the second mode may be reduced to zero if the output of the prime mover is greater than the predetermined threshold value. That is, the second mode is inhibited or the second mode is rendered unavailable to be selected. To this end, for example, the region where the second mode is selected is eliminated from the map for determining the operating mode based on required driving force. According to the present invention, therefore, a shifting operation to the second mode is inhibited if the output power of the engine is large during propulsion and hence the driver may feel shocks and discomfort resulting from shifting to the second mode.

A according to the present invention, alternatively, the selectability of the second mode may be reduced to zero if the engine speed is higher than the predetermined speed. Consequently, the second mode is inhibited or the second mode is rendered unavailable to be selected. To this end, the region where the second mode is selected is also eliminated from the map for determining the operating mode based on required driving force. According to the present invention, therefore, the shifting operation to the second mode is inhibited if the output power of the engine is large to increase the engine speed during propulsion and hence the driver may feel shocks and discomfort resulting from shifting to the second mode.

According to the present invention, specifically, the required driving force is calculated based on an opening degree of the accelerator and a vehicle speed, and an operating point in the map defining the operating regions is determined based on the required driving force thus calculated. According to the present invention, therefore, the operating mode can be shifted appropriately in line with the driver's intention and an actual running condition.

DETAILED DESCRIPTION OF THE PREFERRED EMBODIMENT(S)

Next, the present invention will be explained with reference to the accompanying drawings. The present invention relates to a control system for a hybrid vehicle in which a prime mover includes an engine and a motor. The control system is especially suitable for a hybrid vehicle having at least a motor for controlling a speed of the engine and a motor for generating a driving force.

In the hybrid vehicle of this kind, not only a gasoline engine but also a diesel engine and a gas engine may be used. In addition, it is preferable to use at least one motor having a generating function (such as the motor-generator), but the other motor is not necessarily to generate an electric power.

In the hybrid vehicle to which the control system is applied, an operating mode can be selected from a mode in which the vehicle is powered by the engine, and a mode in which the vehicle is powered by an electric power stored in a battery. Specifically, the operating mode for propelling the vehicle by the engine power can be selected from a mode in which the engine power is partially delivered to driving wheels while operating the motor-generator by the remaining power to generate an electric power for operating the other motor, and a mode in which the engine is used to activate a generator to propel the vehicle by the motor activated by an electric power generated by the generator. Meanwhile, the driving mode for propelling the vehicle by the electric power can be selected from a mode in which the vehicle is power by one of the motors, and a mode in which the vehicle is power by both motors (or motor-generators).

Figure 1:
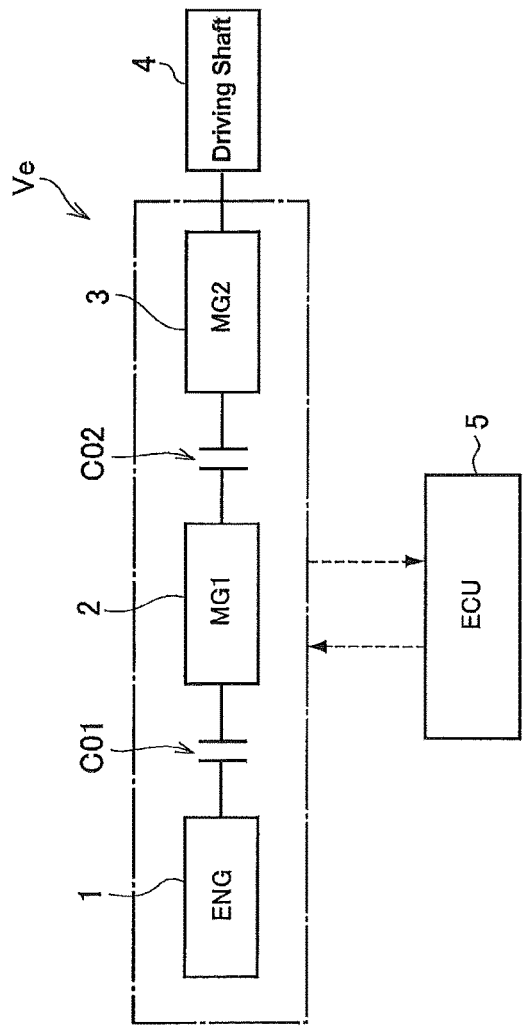
FIG. 1 is a block diagram showing one example of a powertrain of the hybrid vehicle to which the present invention is applied.

Referring now to FIG. 1, there is shown one example of a powertrain of the hybrid vehicle Ve. In the example shown in FIG. 3, an engine (ENG) 1, a first motor-generator (MG1) 2, and a second motor-generator (MG2) 3 are arranged in tandem. Specifically, an output shaft of the engine 1 is connected to a rotor of the first motor-generator (MG1) 2 through a first clutch C01, and the rotor of the first motor-generator (MG1) 2 is connected to a rotor of the second motor-generator (MG2) 3 through a second clutch C02. The rotor of the second motor-generator (MG2) 3 is also connected to driving wheels 4.

Although not especially shown, the motor-generators 2 and 3 are individually connected to the battery through an inverter so that rotational speeds and torques thereof are controlled electrically, and that the motor-generators 2 and 3 are switched electrically between a motor and a generator. In addition, activation and a torque transmitting capacity of each clutch C01 and C02 are also controlled electrically.

In order to control operations of the engine 1, the first motor-generator 2 and the second motor-generator 3, and activations of the first clutch C01 and the second clutch C02, the hybrid vehicle is provided with an electronic control unit (abbreviated as ECU hereinafter) 5.

Thus, the prime mover of the hybrid vehicle Ve includes the engine 1 and the motor-generators 2 and 3, and a power range and output characteristics of each power unit differ from one another. For example, a torque range and a speed range of the engine 1 are widest in those power units, and an energy efficiency thereof is optimized in a higher range. In turn, the first motor generator 2 is used to control a speed of the engine 1 and a crank angle for stopping the engine 1. To this end, the first motor generator 2 is adapted to output large torque in a low speed region. Meanwhile, the second motor-generator 3 is used to apply torque to the driving wheels 4. To this end, the second motor-generator 3 is allowed to be rotated at higher speed than the first motor generator 2, and a maximum torque of the second motor-generator 3 is smaller than that of the first motor generator 2. Therefore, the hybrid vehicle Ve to which the control system of the present invention is controlled in such a manner to improve the energy efficiency and the fuel economy by efficiently controlling the prime mover such as the engine 1 and the motor-generators 2 and 3.

According to the preferred example, an operating mode of the vehicle is selected from the engine mode where the vehicle is propelled by a power of the engine 1, the dual-motor mode where the vehicle is propelled by operating both of the motor-generators 2 and 3 as motors, and the single-motor mode where the vehicle is propelled by a power of any one of motor-generators 2 and 3 (specifically, by the second motor-generator 3).

Figure 2:
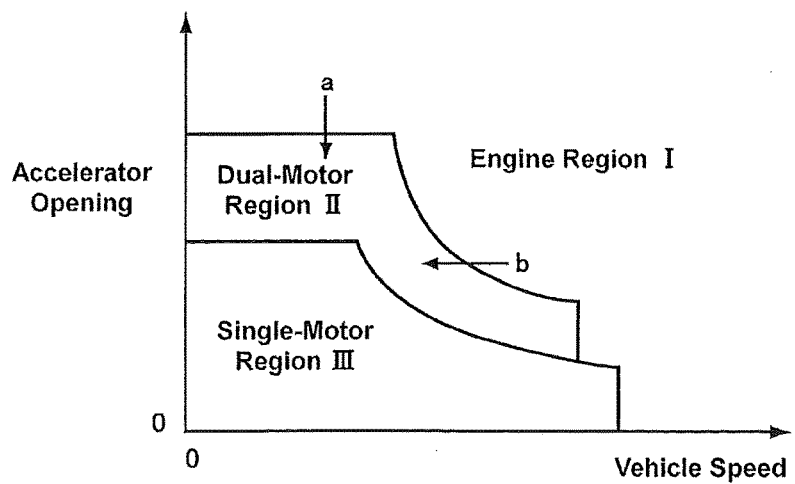
FIG. 2 is a map (diagram) defining regions of the engine mode, the dual-motor mode, and the single-motor mode.

Operating regions of those driving modes are schematically shown in FIG. 2 where a horizontal axis represents a vehicle speed and a longitudinal axis represents an opening degree of an accelerator. As can be seen from FIG. 2, the region I represents an engine region where the "engine mode" is selected, the region II represents a dual-motor region where the "dual-motor mode" is selected, and the region III represents a single-motor region where the "single-motor mode" is selected. The operating mode of the vehicle Ve is selected from those operating modes based on a required driving force. For example, as the case of controlling the engine and the motor-generator(s) in the conventional hybrid vehicle, the required driving force is calculated based on an opening degree of an accelerator and a vehicle speed. Here, the calculation value of the driving force may be adjusted depending on a grade or a class of the vehicle to achieve a required drive performance and drive characteristics. The required driving force thus calculated determines an operating point for selecting the operating mode in FIG. 2.

According to the preferred example, therefore, the "engine mode" is selected provided that the opening degree of the accelerator is larger than a predetermined angle so that the required driving force is larger than a predetermined value, or that the vehicle speed is higher than a predetermined speed. Under the "engine mode", specifically, the engine 1 is operated in such a manner to achieve the required driving force, and both of the clutches CO1 and C02 are brought into engagement to deliver torque generated by the engine 1 to the driving wheels 4 through the motor-generators 2 and 3. In this situation, the torque and the rotational speed of the engine 1 are controlled e.g., by the first motor-generator 2, and if an electric power is generated by the first motor-generator 2 in consequence, the second motor-generator 3 is operated by the electric power thus generated. Accordingly, the engine mode may also be called a hybrid mode.

By contrast, if the opening degree of the accelerator is small and the required driving force is therefore small, the operating point of the vehicle falls within the single-motor region III. In this case, the engine 1 is stopped and at least the second clutch C02 is brought into disengagement. In this situation, the second motor-generator 3 is operated as a motor by supplying the electric power from the battery so that the vehicle Ve is propelled by the second motor-generator 3. Optionally, the crank angle may be adjusted by the first motor-generator 2 to a suitable angle for a preparation of restarting the engine 1.

Then, when the required driving force is increased and hence the operating point is shifted within the dual-motor region II between the single-motor region III and the engine region I, the engine 1 is also stopped, and the first clutch C01 is brought into disengagement and the second clutch C02 is brought into engagement. In this situation, both of the first motor-generator 2 and the second motor-generator 3 are operated as motors by supplying the electric power thereto from the battery. Specifically, the "single-motor mode" and the "dual-motor mode" are permitted to be selected under the conditions that a state of charge (abbreviated as SOC hereinafter) of the battery is sufficient, that the second motor-generator 3 is in condition to generate torque, and that the engine 1 is allowed to be stopped.

During propulsion of the vehicle Ve, the accelerator is operated to address changes in a road gradient, a traffic, a speed limit and so on, and hence a vehicle speed is changed in response to changes in those factors. Consequently, the required driving force of the vehicle Ve is changed and hence the operating mode of the vehicle is shifted in response to a migration of the operating point in the map shown in FIG. 2. For example, if an opening degree of the accelerator is reduced, the operating point of the vehicle is shifted from the engine region I to the single-motor region III via the dual-motor region II as indicated by the arrow "a" in FIG. 2. Likewise, when a vehicle speed is lowered, the operating point of the vehicle Ve is also shifted from the engine region I to the single-motor region III via the dual-motor region II as indicated by the arrow "b" in FIG. 2. Those shifting operations of the operating mode in response to a change in the operating point are carried out by the aforementioned electronic control unit ECU 5.

Figure 3:
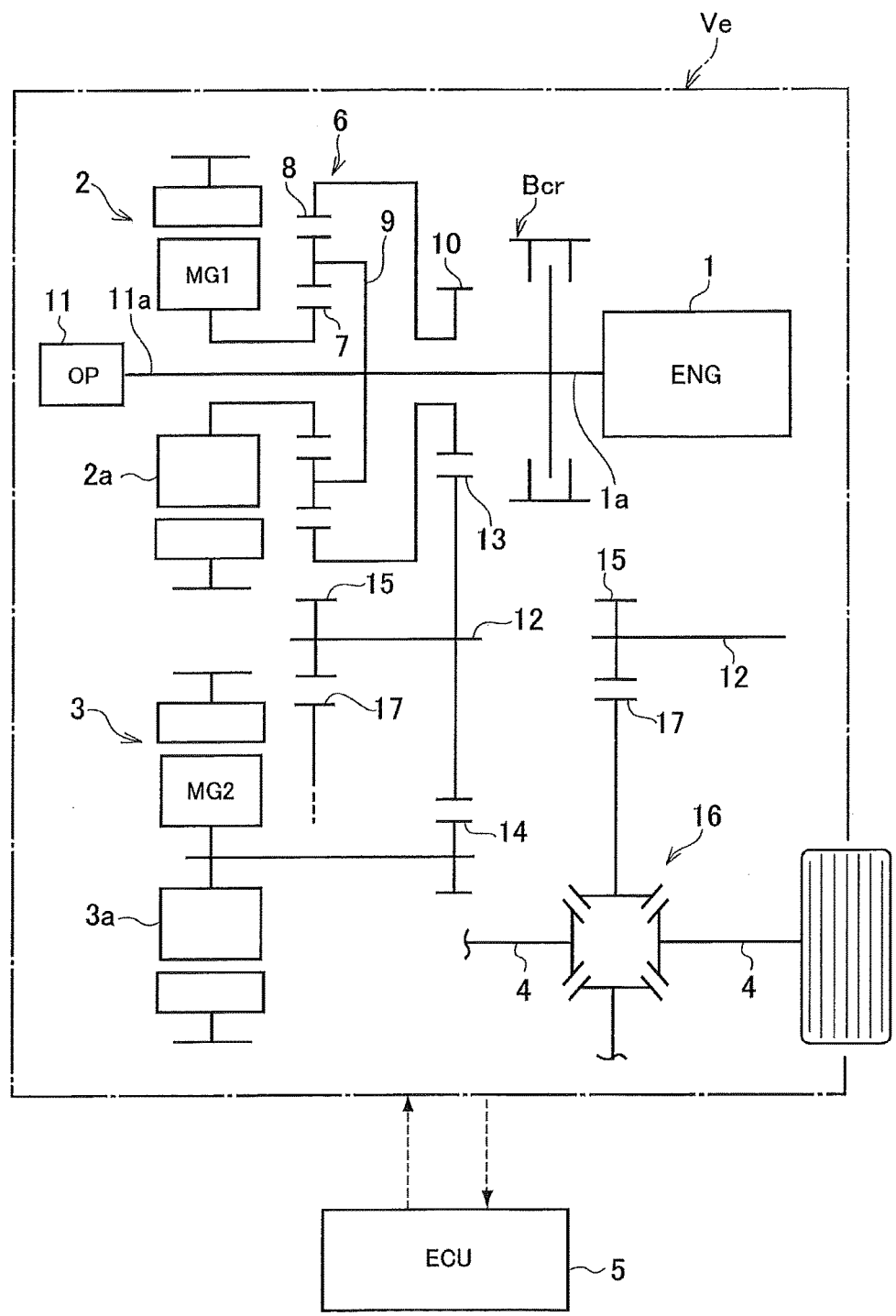
FIG. 3 is a skeleton diagram showing another example of a powertrain of the hybrid vehicle to which the present invention is applied.

Turning to FIG. 3, there is shown another example of power train of the hybrid vehicle Ve to which the control system of the present invention is applied. In the example shown in FIG. 3, a power of the engine 1 is distributed to the first motor-generator 2 side and the driving wheels 4 side, and the second motor-generator 3 is operated by the electric power generated by the first motor-generator 2 so that the driving wheels 4 is driven by the power of the second motor-generator 3. That is, so-called a "two-motor type" hybrid drive vehicle is shown in FIG. 3. In this example, a single-pinion planetary gear unit is used as a power distribution device 6. Specifically, the power distribution device 6 is adapted to perform a differential action among a sun gear as a first rotary element, a carrier as a second rotary element, and a ring gear as a third rotary element.

Specifically, the power distribution device 6 as a single-pinion planetary gear unit is disposed coaxially with the engine 1, and a sun gear 7 is connected with a rotor 2*a* of the first motor-generator 2 disposed in the opposite side of the engine 1 across the power distribution device 6. A ring gear 8 is arranged concentrically with the sun gear 7, and pinion gears interposed between the sun gear 7 and the ring gear 8 while meshing therewith are supported by a carrier 9 while being allowed to rotate and revolve around the sun gear 7. The carrier 9 is connected with an output shaft la of the engine 1, and the ring gear 8 is connected with a drive gear 10 disposed between the engine 1 and the power distribution device 6.

Thus, the carrier 9 of the planetary gear unit serves as an input element of the power distribution device 6, and a brake Bcr is disposed between the drive gear 10 and the engine 1 so as to halt a rotation of the carrier 9. That is, since the carrier 9 is connected to the output shaft la of the engine 1, the brake Bcr halts a rotation of the engine 1. For example, a friction clutch hydraulically brought into engagement may be used as the brake Bcr.

In order to lubricate the power distribution device 6, and to hydraulically control the power distribution device 6, an oil pump (OP) 11 is also connected to the output shaft la on the other side of the engine 1 to be driven by the engine 1.

A counter shaft 12 is arranged parallel to a common rotational center axis of the power distribution device 6 and the first motor-generator 2, and a counter driven gear 13 meshing with the drive gear 10 is fitted onto the counter shaft 12 to be rotated integrally therewith. A diameter of the counter driven gear 13 is larger than that of the drive gear 10 so that a rotational speed is reduced, that is, torque is multiplied during transmitting the torque from the power distribution device 6 to the counter shaft 12.

The second motor-generator 3 is arranged parallel to the counter shaft 12 so that an output torque thereof may be added to the torque transmitted from the power distribution device 6 to the driving wheels 4. To this end, a reduction gear 14 connected with a rotor 3*a* of the second motor-generator 3 is meshed with the counter driven gear 13. A diameter of the reduction gear 14 is smaller than that of the counter driven gear 13 so that the torque of the second motor-generator 3 is transmitted to the counter driven gear 13 or the counter shaft 12 while being multiplied.

In addition, a counter drive gear 15 is fitted onto the counter shaft 12 in such a manner to be rotated integrally therewith, and the counter drive gear 15 is meshed with a ring gear 17 of a differential gear unit 16 serving as a final reduction device. In FIG. 3, however, a position of the differential gear unit 16 is displaced to the right side for the convenience of illustration.

In the power train of the hybrid vehicle Ve shown in FIG. 3, the first motor-generator 2 and the second motor-generator 3 are also connected individually with an electric storage device such as a battery through a not shown controller such as an inverter. Therefore, those motor-generators 2 and 3 are individually switched between a motor and a generator by controlling a current applied thereto. Meanwhile, an ignition timing of the engine 1 and an opening degree of the throttle valve are controlled electrically, and the engine 1 is stopped and restarted automatically.

Figure 4:
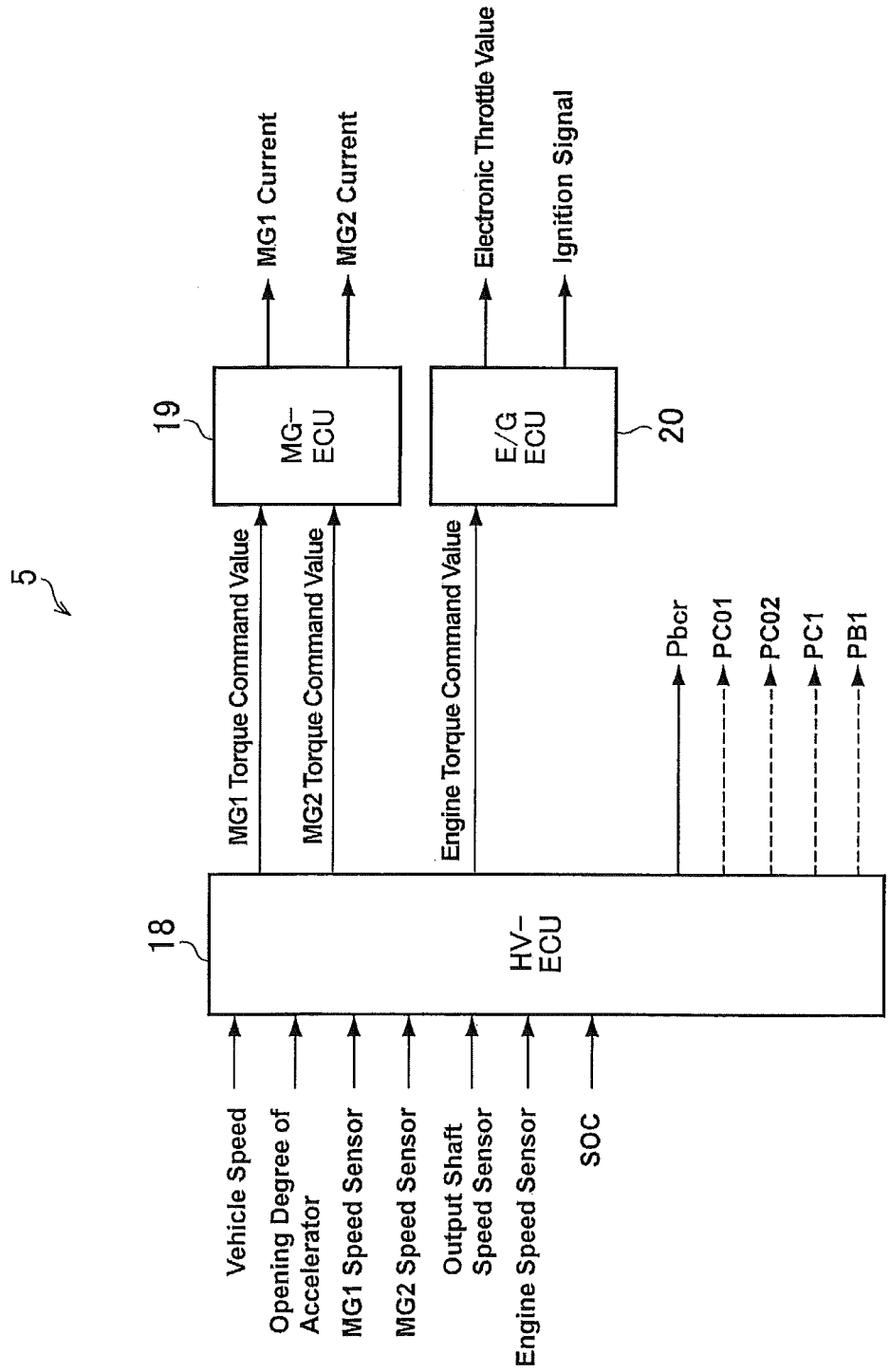
FIG. 4 is a block diagram schematically showing a control system according to the present invention.

As described, operations of the engine 1, the first motor-generator 2 and the second motor-generator 3, and activations of the first clutch C01 and the second clutch C02 are controlled by the ECU 5, and a control system according to the preferred example is shown in FIG. 4.

The ECU 5 is comprised of a hybrid control unit (HV-ECU) 18 for entirely controlling a running condition of the vehicle, a motor-generator control unit (MG-ECU) 19 for controlling the first motor-generator 2 and the second motor-generator 3, and an engine control unit (E/G-ECU) 20 for controlling the engine 1. Each control unit 18, 19 and 20 are individually composed mainly of a microcomputer configured to carry out a calculation based on input data and preinstalled data, and to output a calculation result in the form of a command signal.

For example, a vehicle speed, an opening degree of the accelerator, a speed of the first motor-generator 2, a speed of the second motor-generator 3, a speed of the ring gear 8 (i.e., an output shaft speed), a speed of the engine 1, an SOC of the battery and so on are sent to the HV-ECU 18. Meanwhile, the HV-ECU 18 is configured to output a torque command for the first motor-generator 2, a torque command for the second motor-generator 3, a torque command for the engine 1, a hydraulic command for the brake Bcr and so on. Given that the control system is applied to the power train shown in FIG. 1, the HV-ECU 18 optionally outputs a hydraulic command PC01 for the first clutch C01 and a hydraulic command PC02 for the second clutch C02. Further, the HV-ECU 18 additionally outputs a hydraulic command PC1 for an after-mentioned clutch C1 of a transmission unit 22, and a hydraulic command PB1 for an after-mentioned brake B1.

The torque command for the first motor-generator 2 and the torque command for the second motor-generator 3 are sent to the MG-ECU 19, and the MG-ECU 19 calculates current commands to be sent individually to the first motor-generator 2 and the second motor-generator 3 using those input data. Meanwhile, the torque command for the engine 1 is sent to the E/G-ECU 20, and the E/G-ECU 20 calculates a command to control an opening degree of a throttle valve and a command to control an ignition timing using those input data, and the calculated command values are individually sent to an electronic throttle valve and ignition device (not shown).

Figure 5:
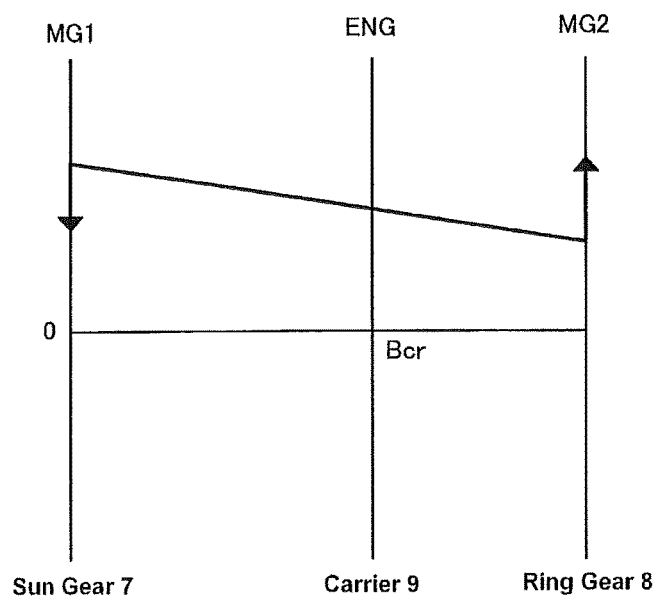
FIG. 5 is a nomographic diagram showing a state of the power distribution device of the power train shown in FIG. 1 under a condition that the vehicle is powered by the engine.

In the hybrid vehicle Ve having the powertrain shown in FIG. 3, the operating mode may also be selected from the above-explained "engine mode", "dual-motor mode" and "single-motor mode". Torques and rotational speeds under each driving mode are shown in FIGS. 5 and 6.

Under the "engine mode", the engine 1 is operated in such a manner to generate a power possible to achieve the required driving force while producing optimal fuel consumption. FIG. 5 is a nomographic diagram of the power distribution device 6. As can be seen from FIG. 5, under the "engine mode", the torque of the engine 1 is applied to the carrier 9, and a resistance torque is applied to the ring gear 8. In this situation, if a negative torque of the first motor-generator 2 is applied to the sun gear 7 (that is, in the direction opposite to the direction of the engine torque), a torque of the ring gear 8 functioning as an output element is increased in the forward direction. Given that the first motor-generator 2 is rotated in the forward direction (i.e., in the same direction as the engine 1), such negative torque of the first motor-generator 2 is generated by operating the first motor-generator 2 as a generator. Consequently, an electric power is generated by the first motor-generator 2, and the electric power thus generated is delivered to the second motor-generator 3 to operate the second motor-generator 3 as a motor. The torque generated by the second motor-generator 3 is added to the torque generated by the engine 1 and transmitted to the driving wheels 4.

Thus, under the "engine mode", the power of the engine 1 is distributed to the first motor-generator 2 side and the drive gear 10 side through the power distribution device 6, and the torque distributed to the drive gear 10 side is further transmitted to the differential gear unit 16 though the counter shaft 12. On the other hand, the power distributed to the first motor-generator 2 side is once converted into an electric power and then converted into a mechanical power again by the second motor-generator 3, and delivered to the differential gear unit 16 through the counter driven gear 13, the counter shaft 12 and so on.

Figure 6:
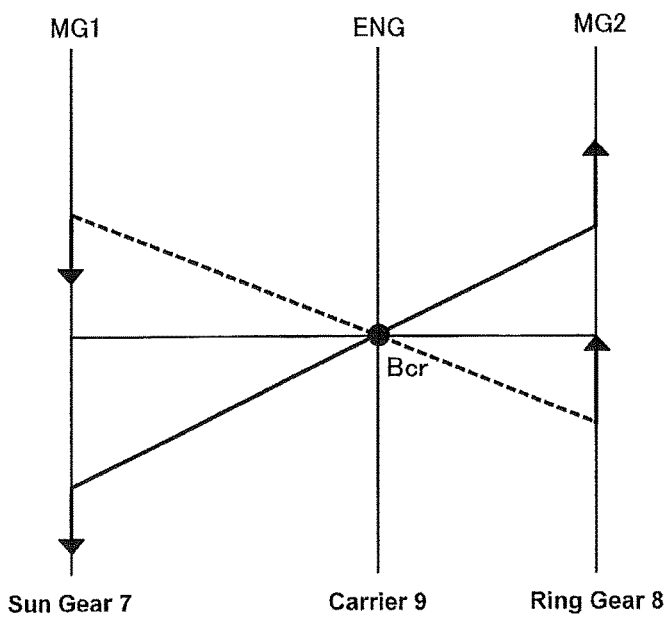
FIG. 6 is a nomographic diagram showing a state of the power distribution device of the power train shown in FIG. 1 under a condition that the vehicle is powered by the motor-generator.

FIG. 6 is a nomographic diagram showing torques under the operating mode for propelling the vehicle Ve using at least any one of the first motor-generator 2 and the second motor-generator 3. For example, under the "single-motor mode", the second motor-generator 3 is rotated in the forward direction, and the torque thereof is delivered to the driving wheels 4 through the counter shaft 12 to propel the vehicle in the forward direction. In this situation, a rotation of the engine 1 is halted by bringing the brake Bcr into engagement to avoid a power loss resulting from rotating the engine 1 passively. Consequently, the first motor-generator 2 connected with the sun gear 7 is rotated in the backward direction. Therefore, an energy regeneration can be achieved while establishing a braking force by also operating the first motor-generator 2 as a motor during reducing the speed.

Under the "single motor-mode", the torque in the forward direction can be applied to the ring gear 8 by rotating the first motor-generator 2 backwardly by delivering the electric power thereto the from the battery. The forward torque thus generated is added to the torque of the second motor-generator 3 and delivered to the driving wheels 4. In this situation, the vehicle Ve is propelled by both of the first motor-generator 2 and the second motor-generator 3, that is, the vehicle Ve is propelled under the "dual-motor mode".

Figure 7:
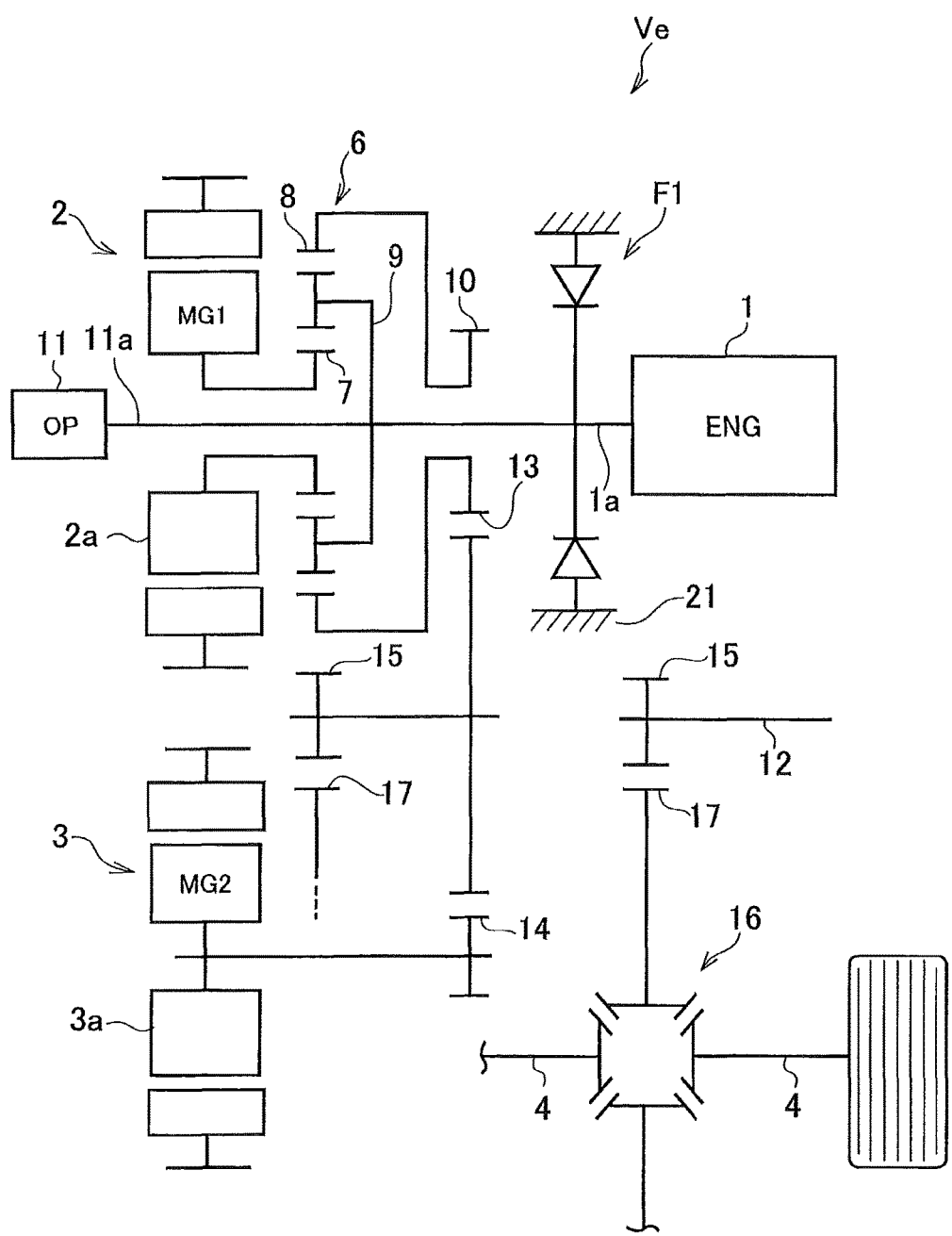
FIG. 7 is a skeleton diagram showing a modified example of the powertrain shown in FIG. 5 in which a one-way clutch is used instead of a brake.

Turning to FIG. 7, there is shown a modified example of the powertrain shown in FIG. 3. In the powertrain shown in FIG. 7, a one-way clutch F1 is used instead of the brake Bcr. Specifically, the one-way clutch F1 is disposed between the output shaft 1a or the carrier 9 and a stationary member 21 such as a housing, and adapted to be brought into engagement when the output shaft 1a or the carrier 9 is rotated in the counter direction to stop rotation thereof. Thus, rotation of the output shaft 1a or the carrier 9 in the counter direction can be halted by the one-way clutch F1. In this case, therefore, the engagement device such as the brake does not have to be controlled during propelling the vehicle by the first motor-generator 2 and the second motor-generator 3 under the EV mode.

Figure 8:
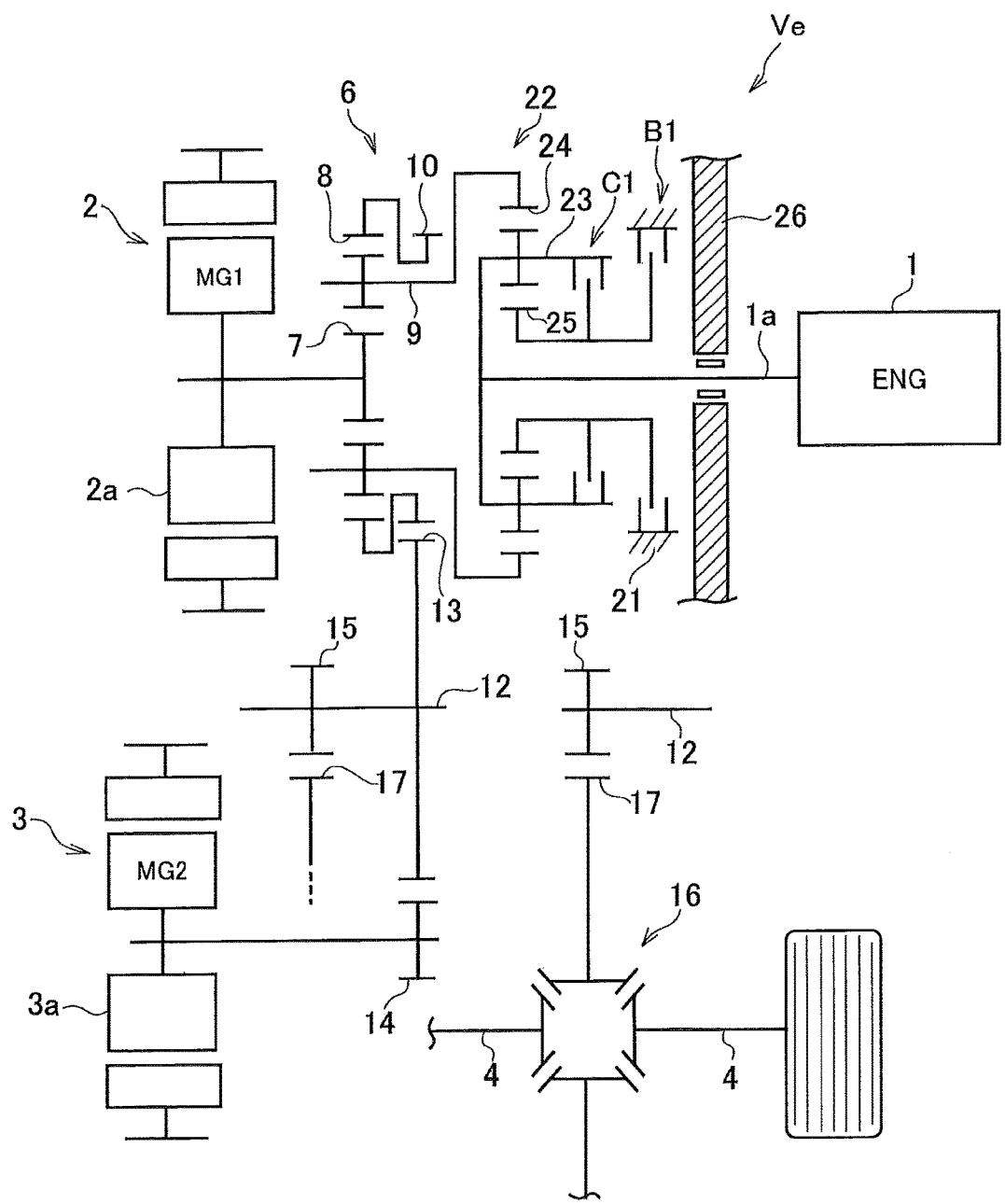
FIG. 8 is a skeleton diagram showing an example of the powertrain in which a transmission is disposed between the engine and the power distribution device.
Figures 10, 11:
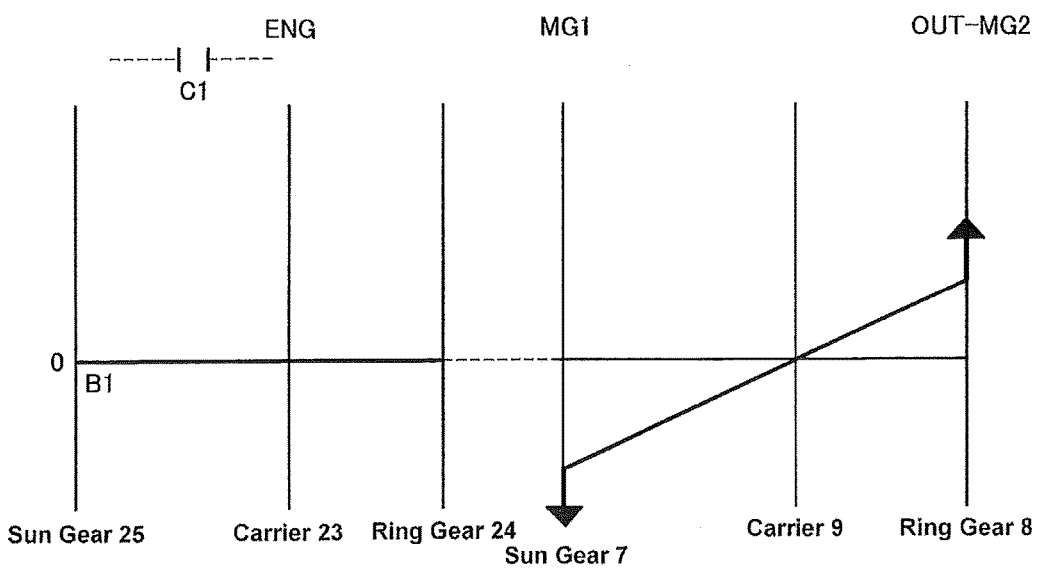
FIG. 10 is a table showing engagement states of the clutch and the brake and operating states of the motor-generators under each operating mode of the powertrains shown in FIGS. 8 and 9.
FIG. 11 is a nomographic diagram showing states of the power distribution device and the transmission unit of the power trains shown in FIGS. 8 and 9 under a condition that the vehicle is powered by the engine.

Turning to FIG. 8, there is shown an example in which a transmission 22 is interposed between the engine 1 and the power distribution device 6. The transmission 22 comprises a single-pinion planetary gear unit, and adapted to shift a gear stage between a direct drive stage and a speed increasing stage (O/D). In the transmission 22, a carrier 23 is connected to the output shaft 1a of the engine 1, and a ring gear 24 is connected to the carrier 9 of the power distribution device 6 to be rotated integrally therewith. In this example, a clutch C1 is disposed between a sun gear 25 and the carrier 23 to connect those elements selectively, and a brake B1 is disposed to halt the sun gear 25 selectively. For example, a hydraulically engaged frictional engagement device may be employed as each of the clutch C1 and brake B1. In the example shown in FIG. 8, in order to simplify a structure of the powertrain, the clutch C1 and brake B1 may be situated in the vicinity of a bulkhead 26 having an internal oil passage for delivering and draining oil to/from the clutch C1 and brake B1. Alternatively, the bulkhead 26 may also be disposed between the single-pinion planetary gear unit, and the clutch C1 and brake B1 as illustrated in FIG. 11. In this case, no significant modification is required in the conventional powertrain of the hybrid drive unit and hence the power train shown in FIG. 8 can be manufactured or assembled easily.

Figure 9:
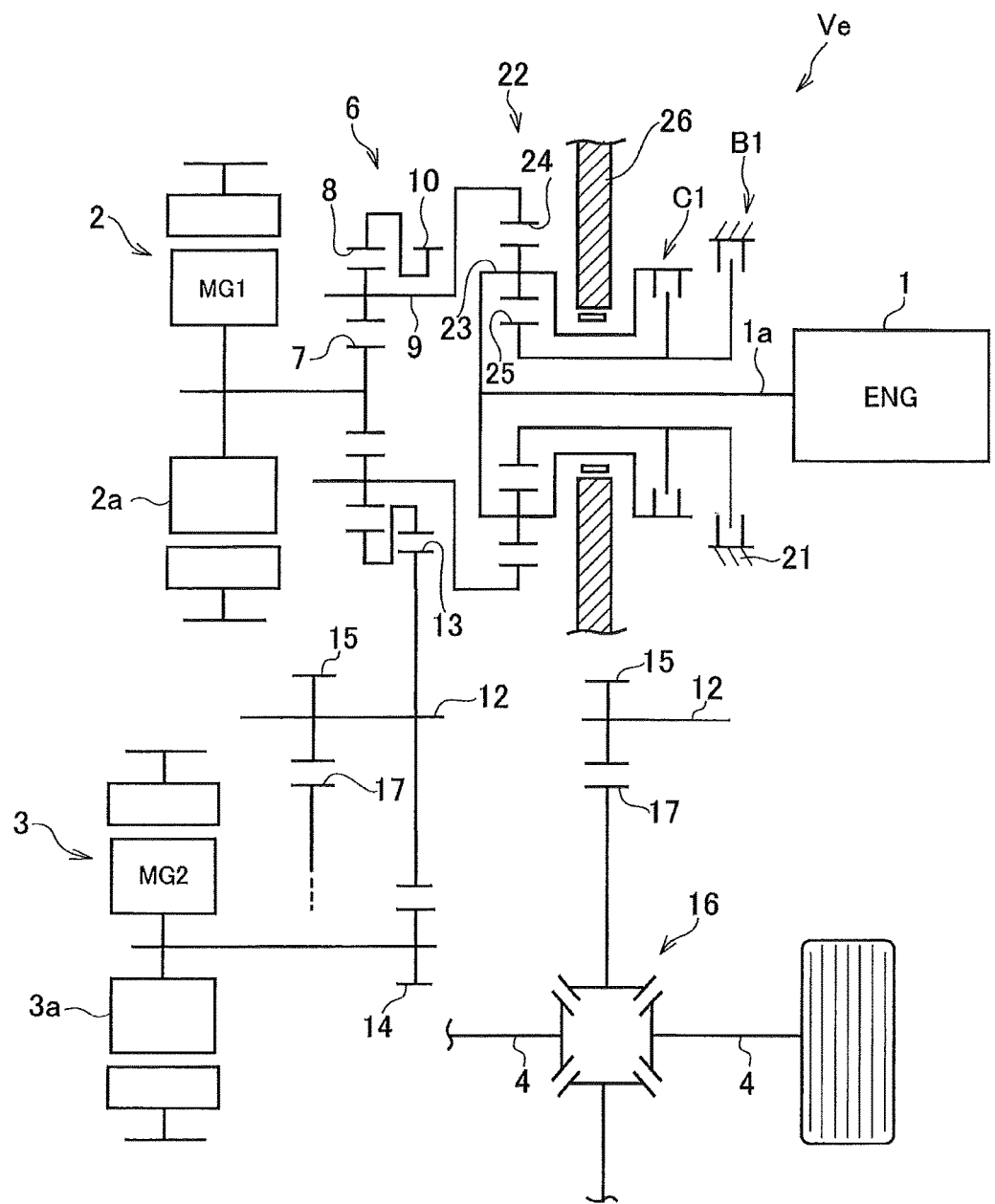
FIG. 9 is a skeleton diagram showing a modified example of the powertrain shown in FIG. 8 in which a position of a bulkhead is altered.

In the transmission 22, the direct drive stage is established by bringing the clutch C1 into engagement to connect the sun gear 25 and the carrier 23, and under the direct drive stage, the planetary gear unit is rotated integrally so that the torque is transmitted without increasing or decreasing the speed. In this situation, the transmission 22 is halted entirely by additionally bringing the brake B1 into engagement so that rotations of the carrier 9 of the power distribution device 6 and the engine 1 are stopped. By contrast, the sun gear 25 serves as a fixing element and the carrier 23 serves as an input element given that only the brake B1 is in engagement. In this situation, the ring gear 24 serves as an output element and rotated in the same direction as the carrier 23 at a speed higher than that of the carrier 23. Consequently, the transmission 22 serves as a speed increasing device, that is, the O/D stage is established. Additionally, although the transmission 22 is disposed in an upstream side of the power distribution device 6 in the examples shown in FIGS. 8 and 9, the remaining strictures in the downstream side of the power distribution device 5 (i.e., the driving wheel 4 side) are similar to those of the examples shown in FIG. 3. Therefore, the "single-motor mode" and the "dual-motor mode" may also be established in the examples shown in FIGS. 8 and 9.

Statuses of the clutch Cl, the brake B1, the first motor-generator 2 and the second motor-generator 3 under each driving mode are shown in FIG. 10. In FIG. 10, "EV" represents the motor mode. As can be seen from FIG. 10, under the "single-motor mode", both of the clutch C1 and the brake B1 are brought into disengagement, the first motor-generator 2 serves as a generator (G), and the second motor-generator 3 serves as a motor (M). In this situation, the first motor-generator 2 may also be idled. Under the "single-motor mode", an engine braking can be applied by bringing both of the clutch C1 and the brake B1 into engagement to halt the carrier 9 of the power distribution device 6.

In turn, under the "dual-motor mode", both of the first motor-generator 2 and the second motor-generator 3 are operated as motors. In this case, both of the clutch C1 and the brake B1 are brought into engagement to halt the carrier 9 of the power distribution device 6 thereby delivering the torque of the first motor-generator 2 from the drive gear 10 to the counter driven gear 13. That is, as shown in FIG. 11, the power distribution device 6 serves as a speed reducing device, and the torque of the first motor-generator 2 is delivered from the drive gear 10 to the counter driven gear 13 while being amplified.

Figure 12:
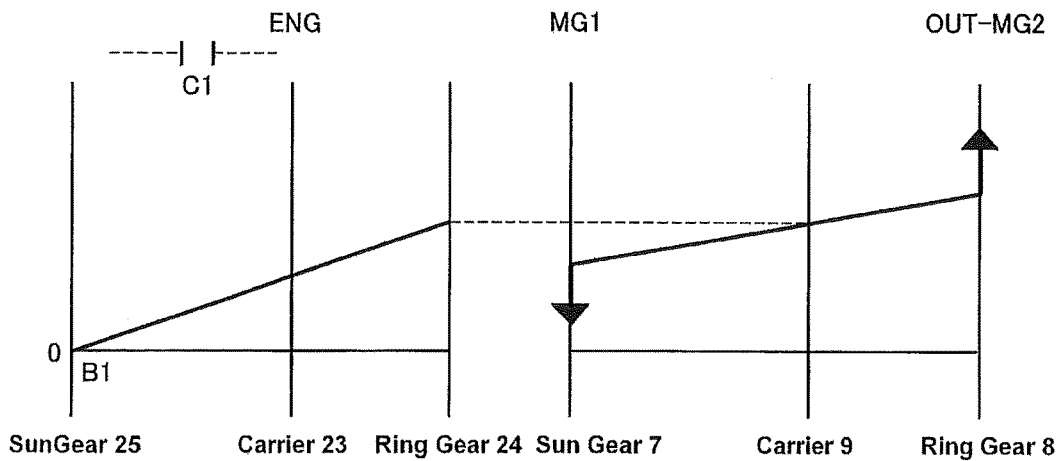
FIG. 12 is a nomographic diagram showing states of the power distribution device and the transmission unit of the power trains shown in FIGS. 8 and 9 under a condition that the vehicle is powered by the motor-generator.

Meanwhile, in FIG. 10, "HV" represents the hybrid mode where the engine is operated. Given that the vehicle Ve runs at a medium to high speed under the HV mode, the O/D stage (high) is established in the transmission 22 by bringing the clutch C1 into disengagement while bringing the brake B1 into engagement as shown in FIG. 12. As described, the rotational speed of the engine 1 is controlled by the first motor-generator 2 in an optimally fuel efficient manner. In this situation, the first motor-generator 2 serves as a generator, and the second motor-generator 3 is driven as a motor to generate a driving force by the electric power generated by the first motor-generator 2. By contrast, when a large driving force is required, for example, when the vehicle speed is low and an opening degree of the accelerator is large, the direct drive stage (low) is established in the transmission 22 by bringing the clutch C1 into engagement while bringing the brake B1 into disengagement, and the transmission 22 is rotated integrally. In this situation, the first motor-generator 2 remains as a generator and the second motor-generator 3 remains as a generator.

In case of propelling the vehicle Ve in the backward direction by operating the engine 1, the direct drive stage (low) is also established in the transmission 22 while operating the first motor-generator 2 as a generator and the second motor-generator 3 as a motor. In this situation, the driving wheels 4 are rotated in the backward direction by controlling rotational directions and speeds of the first motor-generator 2 and the second motor-generator 3.

Figure 13:
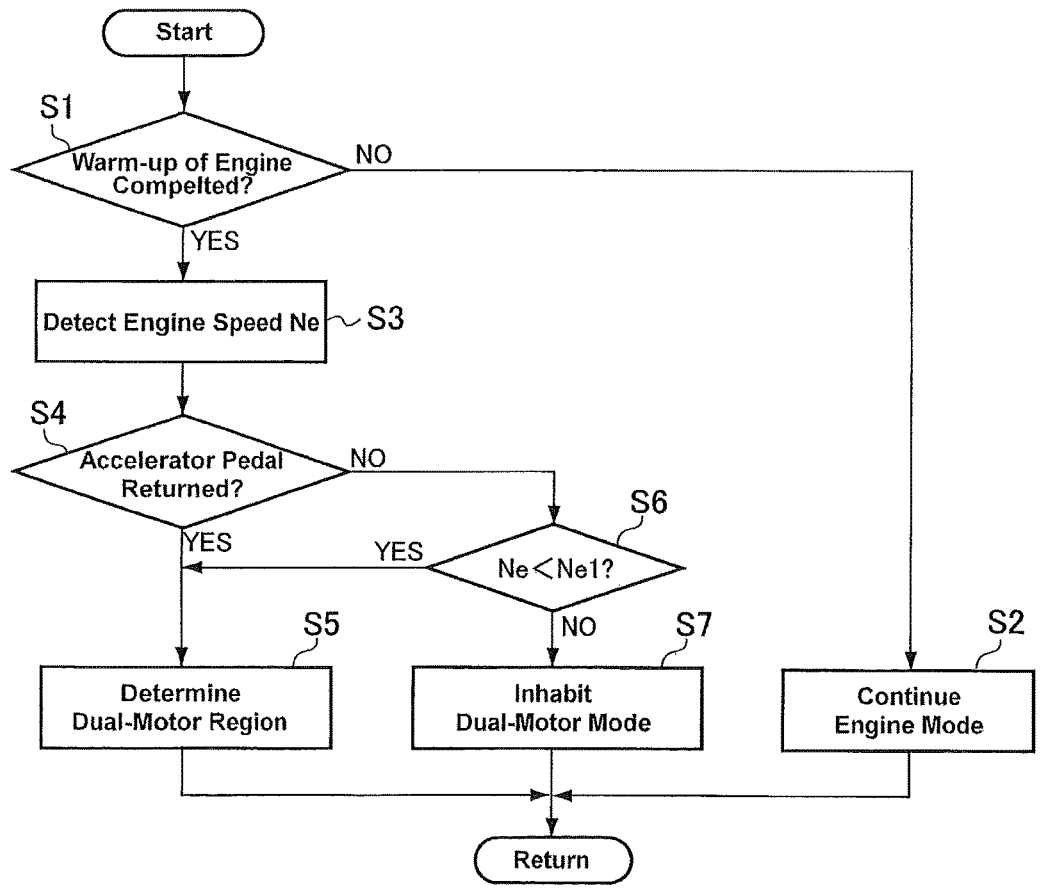
FIG. 13 is a flowchart showing a control example executed by the control system according to the present invention.

Turing to FIG. 13, there is shown a control example of the hybrid vehicle Ve thus structured to be carried out by the control system according to the control system of the present invention. The routine shown in FIG. 13 is repeated at predetermined intervals as long as the hybrid vehicle Ve is powered by the engine 1, that is, the hybrid vehicle Ve is propelled under the "engine mode".

According to the example shown in FIG. 13, first of all, it is determined whether or not a warm-up of the engine 1 has been completed (at step S1). That is, it is determined whether or not the engine 1 can be stopped to shift the operating mode to the "single-motor mode" to power the vehicle Ve by the second-motor generator 3 or to the "dual motor mode" to power the vehicle Ve by the first motor-generator 2 and the second-motor generator 3. For example, completion of warm-up of the engine 1 can be determined based on a temperature of coolant or lubricant of the engine 1.

Optionally, a determination of availability of shifting to the "single-motor mode" or to the "dual-motor mode" may be made based on the SOC of the battery simultaneously with step S1, or before or after step S1.

If the warm-up of the engine 1 has not yet been completed so that the answer of step S1 is NO, the routine advances to step S2 to continue the "engine mode" to power the vehicle Ve by the engine 1, and then returned.

By contrast, if the warm-up of the engine 1 has already been completed so that the answer of step S1 is YES, the routine advances to step S3 to detect a current engine speed Ne. Then, in order to determine a demand output of the engine 1 to achieve a required acceleration of the driver, it is determined whether or not an accelerator pedal is returned to reduce an opening degree of the accelerator (at step S4).

Given that the accelerator pedal is returned, it can be assumed that the driver does not have a desire to accelerate the vehicle and hence the engine 1 does not have to generate power.

If the accelerator pedal is returned so that the answer of step S4 is YES, the routine advances to step S5 to determine a region of the aforementioned dual-motor region II shown in FIG. 2 where the "dual-motor mode" is selected. Then, the operating mode is shifted from the "engine mode" to the "dual-motor mode" with reference to the map shown in FIG. 2 defining the engine region I where the "engine mode" is selected, the dual-motor region II where the "dual-motor mode" is selected, and the single-motor region III where the "single-motor mode" is selected, based on the current vehicle speed and opening degree of the accelerator. That is, the aforementioned shifting operation from the "engine mode" to the "dual-motor mode" while temporarily propelling the vehicle only by the second motor-generator 3 is allowed to be carried out. After thus adjusting the map, the routine is returned.

By contrast, if the accelerator pedal is not returned so that the answer of step S4 is NO, the routine advances to step S6 to determine whether or not the engine speed Ne detected at step S3 is lower than a predetermined speed Ne1. Specifically, the predetermined speed Ne1 is a criterion of a lower limit value of an allowable reduction in the drive torque during shifting the operating mode from the "engine mode" to the "dual-motor mode". Specifically, the predetermined speed Ne1 is determined based on a result of an experimentation or a simulation in such a manner that the driver will not feel any shocks and discomfort resulting from a reduction in the drive torque caused by the shifting operation from the "engine mode" to the "dual-motor mode" as long as the engine speed Ne is lower than the predetermined speed Ne1.

If the engine speed Ne is lower than the predetermined speed Ne1 so that the answer of step S6 is YES, the routine also advances to step S5 to carry out the above-explained control. In this case, the drive torque will not drop significantly even if the operating mode is shifted from the "engine mode" to the "dual-motor mode". In this case, therefore, the shifting operation from the "engine mode" to the "dual-motor mode" while temporarily propelling the vehicle only by the second motor-generator 3 is also allowed to be carried out. Then, the routine is returned.

Figure 14:
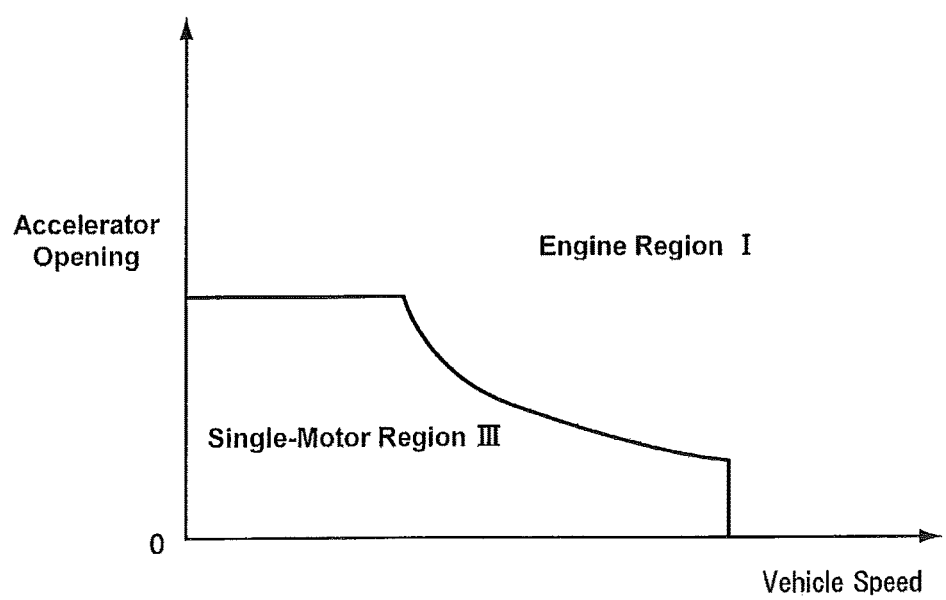
FIG. 14 is a map in which the dual-motor region is eliminated from the map shown in FIG. 2 to reduce a possibility of a shifting to "the dual-motor mode" to zero (or to inhibit a shifting to the "dual-motor mode").

If the engine speed Ne is higher than the predetermined speed Ne1 so that the answer of step S6 is NO, the routine also advances to step S7 to inhibit the shifting of the operating mode to the "dual-motor mode". In other words, a possibility of shifting to the "dual-motor mode" is reduced to zero. To this end, specifically, the dual-motor region II where the "dual-motor mode" is selected is eliminated from the map shown in FIG. 2 defining the engine region I where the "engine mode" is selected, the dual-motor region II where the "dual-motor mode" is selected, and the single-motor region III where the "single-motor mode" is selected, based on the current vehicle speed and opening degree of the accelerator. In this case, a shifting of the operating mode is determined with reference to a map shown in FIG. 14 in which the dual-motor region II is eliminated. Consequently, the operating mode will not be shifted from the "engine mode" to the "dual-motor mode". In this case, therefore, the aforementioned reduction in the drive torque resulting from propelling the vehicle only by the second motor-generator 3 during shifting from the "engine mode" to the "dual-motor mode" will not occur. For this reason, the driver will not feel any shocks and discomfort resulting from a temporal drop in the drive torque. After thus adjusting the map, the routine is returned.

Figure 15:
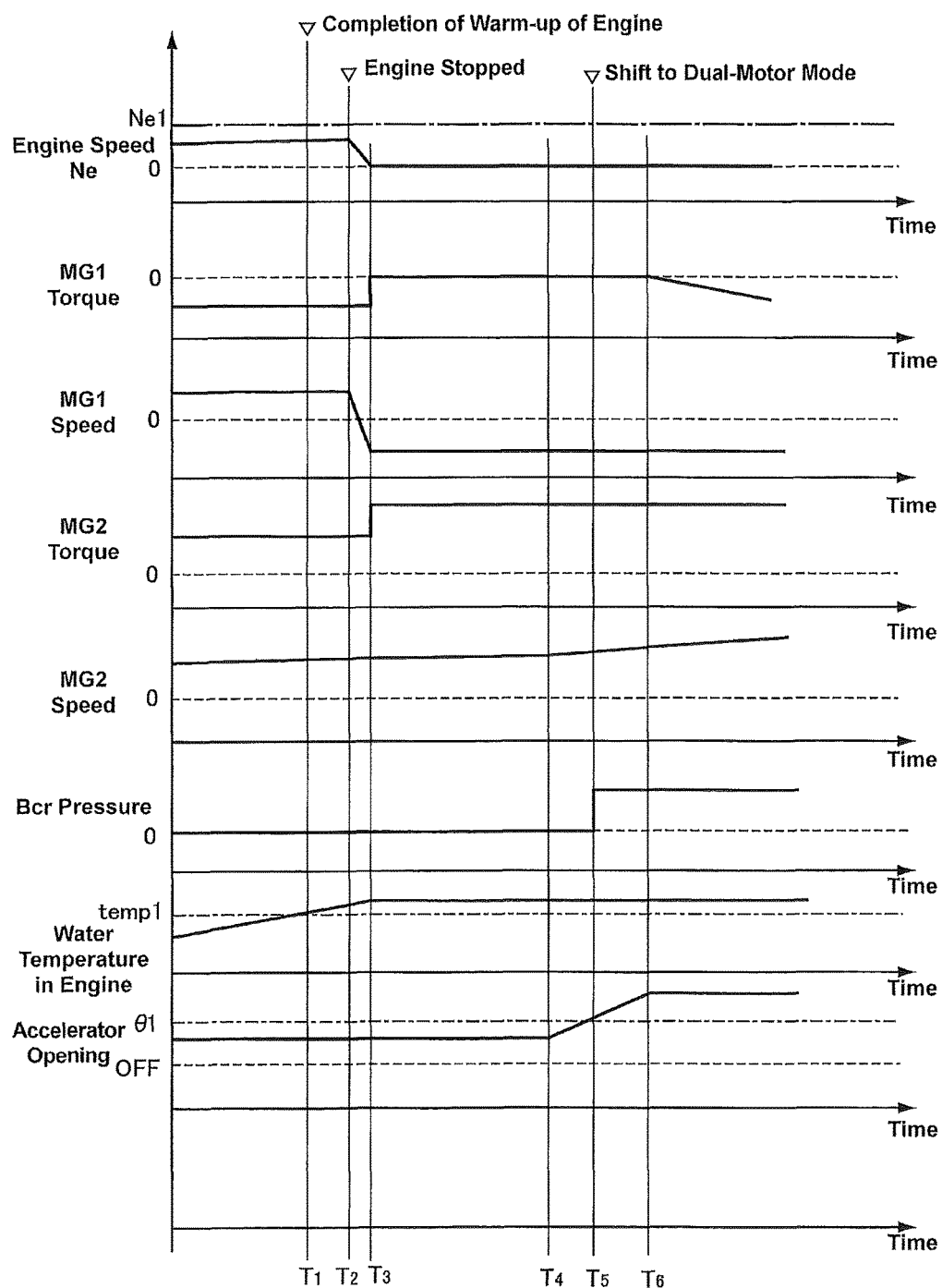
FIG. 15 is a time chart showing changes in speeds of the engine and the motor-generators and torques of the motor-generators during shifting the operating mode from "the engine mode" to "the dual-motor mode".

Changes in torques and speeds of the engine 1, the first motor-generator 2, and the second motor-generator 3 and so on during execution of the control shown in FIG. 13 in the vehicle Ve shown in FIG. 3 are indicated in the time chart shown in FIG. 15. As described, the operating mode will not be shifted from the "engine mode" until the warm-up of the engine 1 is completed. Specifically, the operating mode will not be shifted from the "engine mode" to the "dual-motor mode" or to the "single-motor mode" until a temperature of the coolant (i,e., a water temperature in the engine) is raised to be higher than a predetermined temperature temp1 at point t1.

After the water temperature in the engine has been raised to be higher than the predetermined temperature tempi at point tl, the completion of the warm-up of the engine 1 is determined. In this case, the current engine speed Ne is lower than the predetermined speed Ne1 and hence the operating mode is allowed to be shifted from the "engine mode" to the "dual-motor mode" or to the "single-motor mode". In this situation, if the accelerator pedal is returned and hence the required driving force F is reduced, a determination to shift from the "engine mode" to the "dual-motor mode" is made and a combustion of the engine 1 is stopped (at point t2). Then, the engine speed Ne is reduced to zero by the first motor-generator 2. After point t3 at which the engine speed Ne is reduced to zero, the second motor-generator 3 starts generating a driving torque. In this situation, although the first motor-generator 2 is rotated in the direction opposite to the rotational direction of the engine 1, the first motor-generator 2 does not generate a torque.

Then, the accelerator pedal is depressed is depressed at point t4, and when an opening degree of the accelerator is increased to be wider than a predetermined degree θ1 at point t5, the operating mode of the vehicle Ve is shifted to the "dual-motor mode". Specifically, the brake Bcr is brought into engagement to halt the output shaft 1a of the engine 1. After the increase in the opening degree of the accelerator is stopped at point t6, speeds of the first motor-generator 2 and the second motor-generator 3 are controlled based on the required driving force F and the vehicle speed V.

As described, given that the engine speed Ne is lower than the predetermined speed Ne1 during propulsion of the vehicle Ve under the "engine mode", the aforementioned reduction in the drive torque resulting from shifting the operating mode from the "engine mode" to the "dual-motor mode" does not matter. In this case, therefore, the shifting operation from the "engine mode" to the "dual-motor mode" while temporarily propelling the vehicle only by the second motor-generator 3 is allowed to be carried out.

By contrast, given that the engine speed Ne is higher than the predetermined speed Ne1 during propulsion of the vehicle Ve under the "engine mode", the drive torque drops significantly as a result of shifting the operating mode from the "engine mode" to the "dual-motor mode". In this case, if the operating mode is shifted from the "engine mode" to the "dual-motor mode" while temporarily propelling the vehicle only by the second motor-generator 3, the driver may feel shocks and discomfort resulting from a temporal drop in the drive torque. Therefore, if the engine speed Ne is higher than the predetermined speed Ne1, the shifting operation from the "engine mode" to the "dual-motor mode" is inhibited. Otherwise, the "dual-motor mode" is rendered unavailable to be selected.

Thus, according to the foregoing example, the shifting operation from the "engine mode" to the "dual-motor mode" is inhibited or the "dual-motor mode" is rendered unavailable to be selected if the engine speed Ne detected under the "engine mode" is higher than the predetermined speed Ne1. Alternatively, according to the present invention, it is also possible to alter selectability (or provability to select) of the "dual-motor mode" depending on the output of the prime mover or the engine speed Ne. In this case, specifically, the selectability of the "dual-motor mode" is lowered with an increase in the engine speed Ne during propulsion of the vehicle Ve under the "engine mode".

Figure 16:
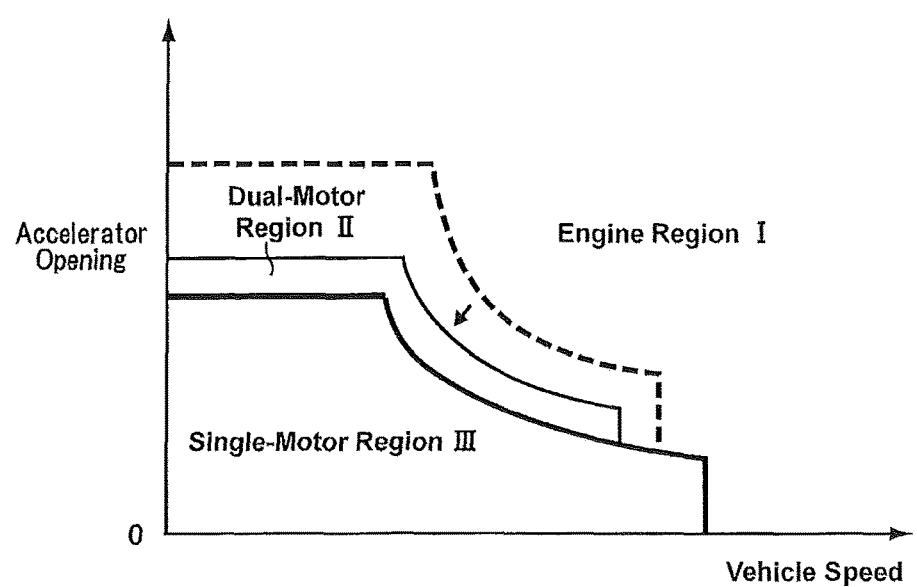
FIG. 16 is a map in which the dual-motor region is altered (i.e., narrowed) from that of the map shown in FIG. 2 to alter a possibility of a shifting to "the dual-motor mode".

In order to alter the selectability of the "dual-motor mode", for example, the dual-motor region II where the "dual-motor mode" is selected may be changed in accordance with the engine speed Ne as shown in FIG. 16. That is, the selectability of the "dual-motor mode" can be represented by an area of the dual-motor region II in the map. Accordingly, the selectability of the "dual-motor mode" can be lowered by narrowing the dual-motor region II. By contrast, the selectability of the "dual-motor mode" can be increased by widening the dual-motor region II. In FIG. 16, specifically, there is shown an example in which the engine speed Ne is relatively high and hence the dual-motor region II is narrowed to lower the selectability of the "dual-motor mode".

As described, according to the foregoing example, the output power of the prime mover is estimated by detecting the engine speed Ne under the "engine mode". However, the first motor-generator 2 and the second motor-generator 3 may also generate power together with the engine 1 under the "engine mode". Therefore, it is also possible to alter the selectability of the "dual-motor mode" based on a total output of the prime mover as a total value of detected values of the engine speed Ne and an output of the battery to the first motor-generator 2 and the second motor-generator 3. In this case, for example, the selectability of the "dual-motor mode" may be reduced to zero if the total output of the prime mover based on the engine speed Ne and the output of the battery is greater than a predetermined threshold value. Consequently, the shifting operation to the to the "dual-motor mode" is inhibited or the "dual-motor mode" is rendered unavailable to be selected. Instead, the selectability of the "dual-motor mode" may be lowered with an increase in the total output of the prime mover based on the engine speed Ne and the output of the battery.

Thus, according to the preferred example, the control system for hybrid vehicles alters the selectability or availability of the "dual-motor mode" depending on the output torque of the prime mover of the vehicle Ve. For example, the selectability of the "dual-motor mode" is lowered with an increase in the output of the prime mover to prevent to select the "dual-motor mode". To this end, specifically, the region where the "dual-motor mode" is selected is narrowed in the map for determining the operating mode. Instead, if the output of the prime mover is greater than the predetermined value, the "dual-motor mode" is inhibited or the "dual-motor mode" is rendered unavailable to be selected. Specifically, the region where the "dual-motor mode" is selected is eliminated from the map for determining the operating mode. In this case, therefore, the "dual-motor mode" is inhibited or the "dual-motor mode" is rendered unavailable to be selected if the output power of the engine 1 is large during propulsion of the vehicle Ve under the "engine mode" and hence the driver may feel shocks and discomfort resulting from shifting to the "dual-motor mode". For this reason, the operating mode can be shifted smoothly to improve operatability and comfort of the vehicle Ve.

Here will be explained a relation between the foregoing example and the present invention. The functional means of step S3 serves as the claimed "detection means", and the functional means of steps S5, S6 and S7 serve as the claimed "setting means".

In the foregoing example, the control system is applied to the two-motor type hybrid vehicle comprising the engine 1, the first motor-generator 2, and the second motor-generator 3. However, the control system may also be applied to a hybrid vehicle having an engine and more than three motors, and a plug-in hybrid vehicle in which a battery can be charged by an external power source.

The invention claimed is:

1. A control system for a hybrid vehicle in which a prime mover includes an engine and a plurality of motors, and in which an operating mode is selected depending on a required driving force from a first mode where the vehicle is powered by the engine, a second mode where the vehicle is powered by the plurality of motors, and a third mode where the vehicle is powered by any one of the motors, comprising:
   a control unit that is configured to detect an output power of the prime mover and
   to alter a selectability of the second mode in accordance with the output power of the prime mover,
   wherein the control unit is further configured to reduce the selectability with an increase in the output of the prime mover.

2. The control system for a hybrid vehicle as claimed in claim 1, wherein the required driving force is calculated based on an opening degree of an accelerator and a vehicle speed.

3. The control system for a hybrid vehicle as claimed in claim 1,
   wherein the hybrid vehicle comprises:
   a power distribution device as a differential gear unit having a first rotary element connected to the engine, a second rotary element connected to a first motor to serve as a reaction element against a rotation of the first motor, and a third rotary element that is connected to a second motor and a drive shaft and that is rotated at a speed governed by speeds of the first rotary element and the second rotary element; and
   a brake that selectively halts a rotation of the first rotary element; and
   wherein the power distribution device is adapted to transmit a torque between the prime mover and the drive shaft while splitting or synthesizing the torque.

4. The control system for a hybrid vehicle as claimed in claim 1,
   wherein the controller is further configured to select the first mode if the required driving force is greater than a predetermined driving force,
   to select the second mode if the required driving force is smaller than the predetermined driving force, and
   to reduce the selectability of the second mode by reducing the predetermined driving force with an increase in the output of the prime mover.

5. A control system for a hybrid vehicle in which a prime mover includes an engine and a plurality of motors, and in which an operating mode is selected depending on a required driving force from a first mode where the vehicle is powered by the engine, a second mode where the vehicle is powered by the plurality of motors, and a third mode where the vehicle is powered by any one of the motors, comprising:
   a control unit that is configured to detect an output power of the prime mover and to alter a selectability of the second mode in accordance with the output power of the prime mover,
   wherein the control unit is further configured to inhibit the second mode if the output of the prime mover is greater than a predetermined value.

6. The control system for a hybrid vehicle as claimed in claim 5,
   wherein the control unit is further configured to detect a speed of the engine, and to inhibit the second mode if the speed of the engine is greater than a predetermined value.

7. The control system for a hybrid vehicle as claimed in claim 5,
   wherein the required driving force is calculated based on an opening degree of an accelerator and a vehicle speed.

8. The control system for a hybrid vehicle as claimed in claim 5,
   wherein the hybrid vehicle comprises:
   a power distribution device as a differential gear unit having a first rotary element connected to the engine, a second rotary element connected to a first motor to serve as a reaction element against a rotation of the first motor, and a third rotary element that is connected to a second motor and a drive shaft and that is rotated at a speed governed by speeds of the first rotary element and the second rotary element; and
   a brake that selectively halts a rotation of the first rotary element; and
   wherein the power distribution device is adapted to transmit a torque between the prime mover and the drive shaft while splitting or synthesizing the torque.

9. A control system for a hybrid vehicle in which a prime mover includes an engine and a plurality of motors, and in which an operating mode is selected depending on a required driving force from a first mode where the vehicle is powered by the engine, a second mode where the vehicle is powered by the plurality of motors, and a third mode where the vehicle is powered by any one of the motors, comprising:
   a control unit that is configured to detect an output power of the prime mover and to alter a selectability of the second mode in accordance with the output power of the prime mover,
   wherein the control unit is further configured to render the second mode unavailable to be selected if the output of the prime mover is greater than a predetermined value.

10. The control system for a hybrid vehicle as claimed in claim 9,
    wherein the control unit is further configured to detect a speed of the engine, and
    to render the second mode unavailable to be selected if the speed of the engine is greater than a predetermined value.

11. The control system for a hybrid vehicle as claimed in claim 9,
    wherein the required driving force is calculated based on an opening degree of an accelerator and a vehicle speed.

12. The control system for a hybrid vehicle as claimed in claim 9,
    wherein the hybrid vehicle comprises:
    a power distribution device as a differential gear unit having a first rotary element connected to the engine, a second rotary element connected to a first motor to serve as a reaction element against a rotation of the first motor, and a third rotary element that is connected to a second motor and a drive shaft and that is rotated at a speed governed by speeds of the first rotary element and the second rotary element; and a brake that selectively halts a rotation of the first rotary element; and wherein the power distribution device is adapted to transmit a torque between the prime mover and the drive shaft while splitting or synthesizing the torque.

* * * * *